3,094,998
DUAL IN-PLACE PIPE CLEANING APPARATUS
Paul R. Gley, Hillsdale, N.J., assignor to Dependable
Printed Circuit Corp., Wayne, N.J., a corporation
Filed Apr. 19, 1962, Ser. No. 189,671
6 Claims. (Cl. 134—56)

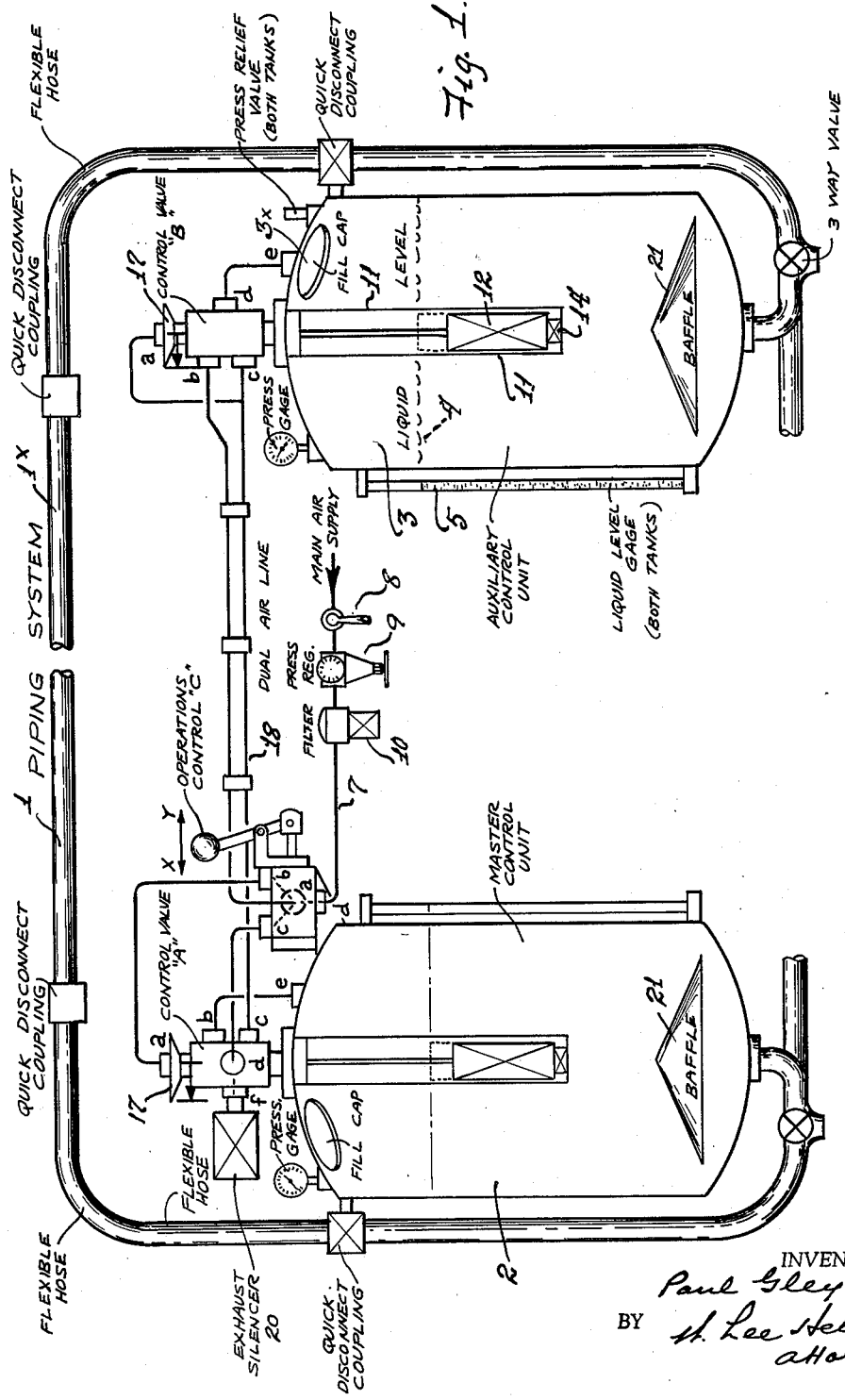

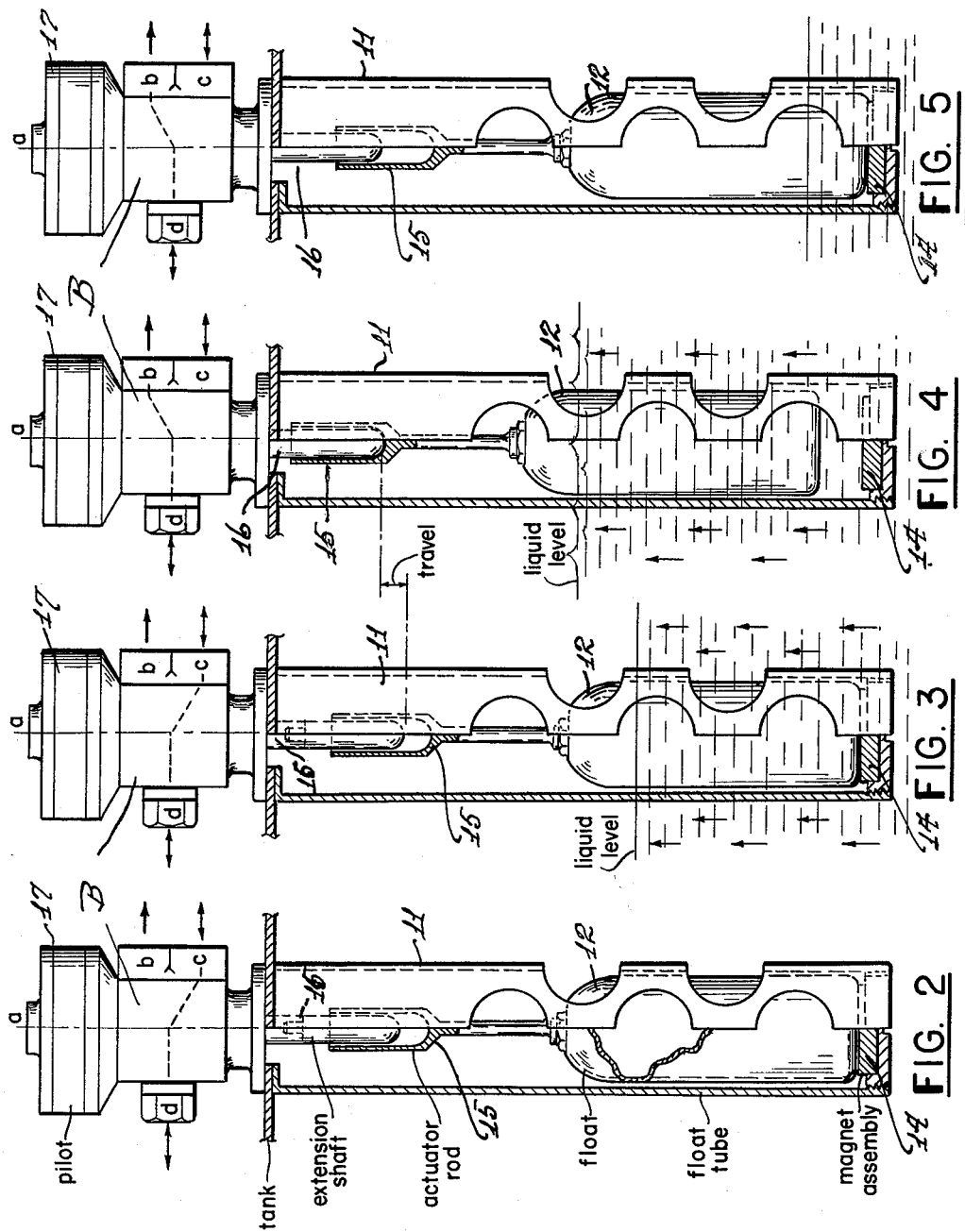

The object of the invention is to provide an in-place pipe cleaning apparatus adapted for thoroughly cleansing the pipe systems receiving fluid in such plants as those processing milk, other fluid food materials and chemicals. In such systems the pipes, and also tanks to which the pipes lead, must be cleaned periodically as for example to meet governmental requirements, and generally to maintain sanitation. The invention overcomes the cost and difficulty of disassembling pipes of a system, and opening up tanks for scrubbing by hand, followed by reassembly of the units. The characteristic of the apparatus is the employment of two tank units, which can readily be mounted on casters, for movement from one pipe and tank assembly to another, together with automatic means for flowing a cleansing fluid through the pipe system in successive opposite directions.

The invention will be described with reference to the accompanying drawings, in which, FIGS. 2 to 5 inclusive illustrate a float valve control assembly in various positions. The said assembly is the same for each of the two tank units of the apparatus.

FIG. 1 is a plan view of the apparatus employing a master control unit and an auxiliary control unit from which the cleansing liquid passes to the pipe system, the latter being indicated by two flexible hose, the end areas of which are broken away.

FIG. 2 is a view in elevation, partly broken away, showing the control-float-operated valve operating assembly positioned for the master control unit of FIG. 1, the valve itself being only diagrammatically shown.

FIG. 3 is a view similar to FIG. 1 showing that the valve control is not operated, due to a magnet force, until the detergent fluid level in the master control unit rises to a predetermined height.

FIG. 4 is a view similar to FIG. 3, illustrating that when the detergent liquid level reaches to a predetermined degree, buoyancy action of the cleansing fluid on the float overcomes the pull of the magnet and the float rises to operate the valve.

FIG. 5 is a view similar to FIG. 4, showing that after drop of the cleansing fluid level from that of FIG. 4, the valve may remain in the position of that figure.

Referring to FIGURE 1, the flexible hose 1 and 1ˣ may be respectively applied to the opposite end of a piping system which in some cases will include one or more tanks. At 2 is shown the tank of a master control unit, and at 3 is shown the tank of an auxiliary control unit. These tanks will customarily be of stainless steel, as, for example, of 25 to 50 gallon capacity. The construction of the units in and applied to the said tanks will now be described, with reference to the operation thereof.

After the hose members 1 and 1ˣ are connected to the opposite ends of the piping system, the tank of auxiliary control unit 3 being adapted to be filled with a cleansing fluid, preferably heated to 120° to 135° F., until it reaches a suitable level, as for example as indicated at dotted lines 4, FIG. 1, the level being indicated on the sight-gauge 5. Inasmuch as the cleaning solution is caused to flow at high velocity, usually 15 ft. per second, it should include a non-foaming agent. At 8 is a valve controlled by a hand operated lever 6. The valve receives air under pressure from an air supply pipe 7, and is followed by a pressure regulator 9 and a filter 10. The pressure regulator should be set to read 100 p.s.i.

In tank 3 of the auxiliary control unit is perforated cylindrical housing 11 for a float 12, normally held down by a magnet 14. When tank 3 is filled, after removing closure cap 3ˣ, to the level shown in FIG. 4, the buoyancy of the cleansing fluid will raise the float to the point where its valve operating post 15 engages and actuates valve stem 16, and thus operates control valve B.

For better understanding of this action, it should be explained that the float valve assembly shown in FIGURES 2 to 5 inclusive, is positioned for the master control unit, and the same assembly, but turned 180°, is employed for the auxiliary control unit with tank 3.

The construction of control valve B (as well as its counterpoint control valve A) is standard, and hence not claimed. It is provided with an internal reciprocating ported post adapted in down position to connect ports c and d with port e in tank 3, and also adapted in up position to shut off port d and connect ports c and a. Port a leads to a diaphragm, schematically indicated at 17, FIG. 1, adapted to move the valve post down, when receiving air pressure, such action incidentally restoring the float 12 to down position in the tank.

When the auxiliary control unit tank 3 is filled to start a pipe cleaning operation, the float will "pop" up out of the liquid, thereby operating control valve B to the "b"—"d" position. The master control unit remains empty.

The operator then sets the control valve A on the master control unit. This is done by first moving the operations control C to the X position, as shown. The operator then turns on the main air supply and regulates the pressure to 100 lbs. The air now passes through the operations control C via ports a and b of that control, and on onto the diaphragm of control valve A. The diaphragm pushes the valve post in A down, thereby opening port d to c and port b to f, the latter being exhaust.

To start the automatic cycling operation the operator simply pulls back on the handle of the operations control C at the master control unit, and moves the handle to position Y.

The high pressure air at operations control valve C now passes on through port c to port d of the control valve A, through said control valve and on out port c, through air line 18 to port c and a on the control valve B, which is being held with the valve body up, by the float in the liquid in the auxiliary control unit. However, the high pressure air entering port a of control valve B operates the diaphragm of said valve, which overcomes the pressure exerted by the float, and forces down the valve post of said valve, opening ports c to d allowing the air to pass on through air line connection to port e located at the top of tank 3, forcing the cleaning solution out the bottom of said control unit.

The cleaning solution moves on out the auxiliary control unit tank 3, on through the pipe lines system, at a very rapid rate (15–20 feet per second). The air ahead of the cleaning slug is exhausted through the master control tank 2, out port e and air line to port b and port f of control valve A to an exhaust silencer 20.

The cleaning solution will finally arrive at the master control unit, where it enters at the bottom and is deflected by baffle 21, provided to prevent the cleaning fluid from disturbng the float in its casing.

As the cleaning solution rises, it surrounds the float in the master control unit tank 2, which float is held magnetically to prevent same from rising, until the buoyancy of the float is strong enough for it to break loose from the magnetic pull. At a predetermined level, the float will automatically pull away from the magnet and "pop" on up out of the liquid, this action will force the valve body in control valve A to rise, thereby connecting port *d* to port *b* and port *c* to port *f*.

The high pressure air will now stop flowing out ports *d* to *c*, and the exhaust air will stop flowing out ports *b* to *f* of said control valve A, and hence air line 18 leading to tank 3 is shut off.

The said valve action will now recycle the cleaning solution. High pressure air will now pass from port *d* to port *b* of control valve A and to port *e* at the top of the master control unit tank 3, thus forcing out the cleaning solution. The float in said control unit tank 2 will drop with the liquid level, finally coming to rest on the magnet at the bottom of the float tube.

The cleaning solution will leave through the bottom of tank 2 and pass on out through the pipe line system to be cleaned. The air to be exhausted from the pipe line system will enter the auxiliary control unit tank 3, pass on out through port *e* of said unit, through port *d* of control valve B, out port *c*, through *c* on control valve A, through said control valve, out port *f* to the exhaust silencer.

The cleaning solution rising in the auxiliary control unit will finally force the float to break loose from the magnet at the bottom of the float tube. The float will "pop" up out of the said cleaning solution, thereby activating the valve body in control valve B. The control valve B which was exhausting air from the auxiliary control unit, through ports *d* to *c* will now exhaust same said air through port *d* to port *b*. This new routing of the exhaust air makes possible the automatic triggering of control valve A as the exhaust air now travels through the upper line of the dual air line, entering port *a* on operations control C through said control valve, out port *b* through air line to port *a* at top of control valve A, operating diaphragm, which moves valve body down, closing ports *b* to *d* and *c* to *f*, opening ports *d* to *c* of said control valve A. The cleaning solution will now be automatically returned from the auxiliary control unit through the pipe line system back to the master control unit, and the automatic recycling will continue until the operator wishes to stop same.

To stop the cleaning cycle the operator opens the drain valve, located at the bottom of the master control unit. The air in the pipe lines, ahead of the returning cleaning solution will now exhaust through this valve. The cleaning solution having passed through the pipe line system will also be discharged through said drain valve. When the system has been drained completely, the operator simply closes the main air supply valve and returns the operations control valve C to the X position. The apparatus is now ready for refilling and a new cleaning cycle.

As stated, the control valves A and B are of the same construction and are identified in the trade, respectively, as a four-way piped exhaust valve, pilot operated; and as a three-way piped exhaust valve, pilot operated—standard valves of the trade.

Having described my invention, what I claim and desire to secure by Letters Patent is as follows:

1. A dual in-place pipe cleaning apparatus comprising a first and a second cleansing fluid tank, conduit means from each tank adapted for connection with piping to be cleaned, at opposite ends of said piping, a valve carried by each tank, one valve having an exhaust port, a float in each tank, means carried by the float in each tank for operating said valve, magnet means acting upon the float to hold the same in downward position until the fluid in the tank reaches a predetermined height, a source of air under pressure and pipes leading therefrom to the two valves, and pipes connecting each valve to its appropriate tank, said valves being so constructed that upon the rise of the float in either of the tanks, overcoming the force of its appropriate magnet, the resultant operation of the valve for said tank connects the air line to said tank and opens the exhaust port in the valve for the second tank.

2. A dual in-place pipe cleaning apparatus constructed in accordance with claim 1, in combination with an operated control device connected to each of said valves and connected to the pipes for air pressure, and adapted to move the float into contact with its magnet in its tank independently of action on the float by the buoyance of the fluid in the tank.

3. A dual in-place pipe cleaning apparatus constructed in accordance with claim 1, in which two air lines connect the two tank valves, in combination with a hand operated control valve in one of said air lines and adapted to selectively shunt air under pressure to either of said air operated control devices.

4. A dual in-place pipe cleaning apparatus constructed in accordance with claim 1, in which the filling of either tank and the operation of its valve by rise of its float operated means, opens the air line to said tank and to the valve of the second tank for exhaust from the latter tank and with automatic repetition.

5. In a dual in-place pipe cleaning apparatus constructed in accordance with claim 1, employing two tanks for cleansing fluid, a first tank adapted for connection to a piping system to be cleaned and to a second tank, the valve for said second tank being disposed vertically thereof and in line with its float operating means, four ports in the body of said valve, *a*, *b*, *c*, and *d*, controlled by the valve post in the valve body, a first and a second air line, port *a* leading to said first air line and to the means adapted to move the float into contact with its magnet independently of buoyancy of the fluid in the tank, port *c* being connected to said first air line, port *b* to the second air line, and port *d* to the interior of the tank, and a movable control post in said valve body adapted to selectively open and close said ports, upward movement of the post by the action of the float establishing air flow connection between the port *a* and the first air line, and between ports *c* and *d*, and also opening port *b* to the second air line for exhaust of air from said second tank.

6. In a dual in-place pipe cleaning apparatus constructed in accordance with claim 1, employing two tanks for cleansing fluid, a second tank adapted for connection to a piping system to be cleansed and to a first tank, the valve for said second tank being disposed vertically thereof and in line with its float operating means, four ports in the body of said valve, *b*, *c*, *d* and *f*, controlled by the valve post in the valve body, an air line leading to said valve, port *d* being connected to said air line, port *b* being connected to the interior of the tank and port *c* being connected to an air line adapted to communicate to the interior of the second tank, and port *f* being connected to exhaust, movable control post in said valve body adapted to selectively open and close said ports, upward movement of the post by the action of the float establishing air flow connection between port *d* and the first air line, and between port *b* and the interior of the tank, and between port *f* and said second air line for exhaust of air from said first tank.

References Cited in the file of this patent

UNITED STATES PATENTS

| | | |
|---|---|---|
| 2,145,540 | Ellis | Jan. 31, 1939 |
| 2,771,891 | St. Palley | Nov. 27, 1956 |